United States Patent [19]
Smith

[11] 3,881,704
[45] May 6, 1975

[54] WATER TREATMENT APPARATUS

[75] Inventor: Fred Smith, Norwich, England

[73] Assignee: Lord Mayor, Aldermen and Citizens of the City of Norwich, City Hall, Norwich, Norfolk, England

[22] Filed: June 13, 1972

[21] Appl. No.: 262,379

[30] Foreign Application Priority Data
June 24, 1971 United Kingdom............... 29737/71
Mar. 23, 1972 United Kingdom............... 13644/72

[52] U.S. Cl. ................ 259/8; 259/95; 259/DIG. 30
[51] Int. Cl.............................................. B01f 7/22
[58] Field of Search........... 259/7, 8, 23, 24, 43, 44, 259/95, 96, 97, DIG. 30; 23/252

[56] References Cited
UNITED STATES PATENTS

| | | | |
|---|---|---|---|
| 2,971,748 | 2/1961 | Ellegast | 259/95 |
| 3,220,801 | 11/1965 | Rill | 259/8 |
| 3,265,365 | 8/1966 | Ward | 259/8 |
| 3,430,925 | 3/1969 | Buhner | 259/8 |
| 3,560,430 | 2/1971 | Meyer | 259/7 |

*Primary Examiner*—Robert W. Jenkins
*Attorney, Agent, or Firm*—Lawrence Rosen; E. Janet Berry

[57] ABSTRACT

Apparatus is described which is of particular value for forming a complex alkali metal-aluminium-silicate material that is completely soluble in hydrochloric acid and that is of particular value as a coagulant or coagulant aid in the removal of solids from an aqueous suspension. The apparatus comprises a mixing chamber, at least three separate inlets for liquids to the chamber, an outlet duct at a position distant from the inlets, a hydraulic ejector to which the outlet duct leads and means for mixing under high shear within the chamber material introduced through the inlets.

7 Claims, 5 Drawing Figures

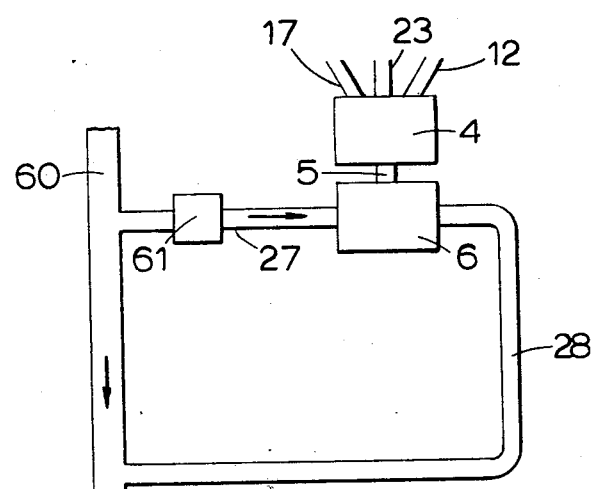
FIG.5.
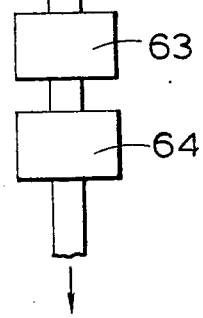

WATER TREATMENT APPARATUS

This invention relates to a mixing apparatus that is of particular value in the production and application of a product useful in the removal of suspended matter from aqueous suspensions, the product conveniently being called a coagulant or coagulant aid.

It is already known to use material commonly referred to as "activated silica" as a coagulant aid. Activated silica is substantially wholly insoluble in acid and is generally made in situ by reducing the pH of a sodium silicate solution, for example by adding chlorine or sulphuric acid to it, and allowing the mixture to age for a time that is dependent upon the concentration. In other methods aluminium sulphate has been used. The known methods for forming activated silica and in fact the known methods for forming any reaction product that is to be added to a large volume of an aqueous suspension have generally involved mixing in a large vessel, retaining for ageing purposes and then metering the product out of this vessel either automatically or manually and subsequently mixing it into the aqueous suspension. For example when the material to be added to the aqueous suspension was an activated silica this was generally formed in an open launder or in a large cylindrical vessel containing paddles that rotate relatively slowly for example 30 revolutions per minute. Even though the paddles or other impellors rotated relatively slowly in this manner it was generally considered that the mixing achieved was rapid and thorough.

We describe in our copending Application Ser. No. 262,865 filed even date herewith, now abandoned that it is possible to make a new complex polymeric alkali metal-aluminium-silicate material that is completely soluble in hydrochloric acid and which has particularly valuable coagulant and coagulant aid properties by vigorously mixing with high shear an aqueous solution of alkali metal silicate and aqueous solution of an aluminium salt in such proportions and under such conditions that a complex alkali metal aluminium silicate polymeric material is formed substantially immediately upon contact of the solutions and is rendered into a stable dispersion in water.

We have now devised an apparatus that combines the advantages of not only permitting the formation of the new product in a particularly efficient and continuous manner but also results in the product being either dosed directly into the suspension or else being diluted in a controllable amount to form a dilute solution that can easily be dosed into the suspension to be treated.

Apparatus according to the invention comprises a mixing chamber, three separate inlets for aqueous solutions, an outlet duct, at a position distant from the inlets, leading to a hydraulic ejector, and means for mixing under high shear within the chamber material supplied through the inlets.

The mixing chamber may simply be a cylindrical vessel. The chamber is normally upright and the inlets normally lead into the chamber at or near the bottom of it and the outlet normally leads out from the chamber at or near the top of it, and the means for mixing under high shear are near the bottom of the vessel, between the inlets and the outlets. It is essential that mixing should be conducted only under high shear and thus the apparatus should be designed so that there is substantially no gradual mixing of the solutions before they are subjected to high shear. This can adequately be ensured by providing the means for mixing under high shear close to the inlets, i.e., close to the base of the vessel when the inlets are in the base. For example the means for applying high shear are usually as close to the bottom of the vessel as is practicable, for example 0.5 to 5 millimeters above the inlets. In practice we have found that in the particular design of apparatus that we are using that mixing without shear is liable to occur if the means for mixing under shear are positioned further than about 6 mm away from the inlets. Naturally this distance will depend to some extent at least upon the separation of the inlets.

The means for applying high shear generally comprise rotor blades, and means for rotating the blades at an adequate speed. It is necessary that adequate shear should be exerted close to the point of entry of the inlets into the chamber and so naturally it is desirable that the inlets should not be positioned axially but should be positioned some distance along the radii of the chamber. Preferably the inlets are positioned substantially uniformly around the base at a distance of from one half to seven eighths of the radius from the axis of the chamber.

The rotor blades should preferably extend out from the axis at least as far as the inlets and often slightly further. For example the rotor blades may have a diameter not less than two thirds of the diameter of the chamber.

The means for rotating the rotor blades should be effective to rotate the blades at at least 500, and preferably 1,000, r.p.m. for each 2.5 cm of chamber diameter. Thus in a 10 cm chamber the blades may, for example, rotate at 4,000 r.p.m. In such a chamber a suitable range of speeds of rotation is 2,000 to 6,000 r.p.m.

It will be found in practice that very high speeds of rotation may be undesirable or impossible to obtain. For example cavitation may occur but it is possible to reduce the risk of this by appropriate design of the blades. Also it is impracticable to design apparatus in which the blades have to rotate at extremely fast speeds but this does not cause any serious limitation in the invention since in practice there is no advantage in having a chamber greater than, say, 20 centimeters in diameter and usually lesser diameters, for example 5 to 15 centimeters are adequate, and appropriate speeds of rotation for such chambers can easily be obtained.

Although adequate shear can be obtained using rotor blades shear can also be effected by an emulsifier unit positioned in the base of the vessel, close to the inlets. The emulsifier unit will include a stationary member and the design of the unit will be such that material coming from the inlets is mixed on being forced through a narrow aperture within the unit. Conveniently the emulsifier unit comprises the rotor blades described above and also stator blades. In such an apparatus it is usually desirable for the rotor blades to extend rather further across the diameter of the apparatus than indicated above, and indeed either or both of the rotor or stator blades may extend across substantially the entire diameter of the chamber. The stator or rotor blades, usually the stator blades, may be fixed substantially vertical or at a small angle to the vertical while the other blades may be fixed at a small angle to the horizontal. The small clearance between them may be, for example, 0.8 to 6 mm.

The means for rotating rotatable members in the chamber may comprise any suitable motor, usually an electric motor mounted above the chamber and which drives a shaft which extends down into the chamber and which carries at its base the rotatable blades.

The outlet preferably leads immediately into the hydraulic ejector and thus the hydraulic ejector is conveniently attached to the side of the chamber. Ducting for a high pressure water supply may be connected to lead to it and outlet ducting may be connected to lead away from it to take away the water supplied to the ejector and the product sucked out of the vessel by the ejector. The high pressure water supply may be part of the water supply that has to be clarified using the product as coagulant or coagulant aid.

Although apparatus conventionally used for mixing silicate-containing chemicals for the treatment of water is normally extremely bulky the apparatus of the invention is usually quite small, the mixing chamber generally having a diameter of only a few centimeters and having a volume below its outlet of 1 litre or less. Despite its small size it has a high through put and can be used for supplying at a fast rate coagulant suitable for treating a very large volume of water.

As explaned in our copending Application Ser. No. 262,865 now abandoned the alkali metal silicate used is preferably sodium silicate that is supplied as a concentrated aqueous solution and the aluminium salt is preferably aluminium sulphate that is supplied as an aqueous solution. It is desirable that a large amount of water should be supplied to the mixing vessel and so there is a third inlet in the base of the vessel, through which water can be supplied.

Provided the conditions of operation are correct, and in particular the proportion of sodium silicate to aluminium sulphate and the prevailing pH is correct, the product obtained is soluble in hydrochloric acid but deposits of the product may tend to accummulate in the apparatus. Accordingly it is preferred that the apparatus should include also a fourth inlet, usually also leading into the base of the chamber, to permit the introduction of acid for cleaning the chamber and in fact for cleaning the entire apparatus.

The apparatus preferably operates continuously and automatically and so ducting preferably leads to each inlet through appropriate control and metering means. The control and metering means in the ducting leading from a supply of acid to the chamber may include an electrically operated time clock in order that the acid is supplied to the mixing chamber at predetermined time intervals, for example 1 to 10 times a day.

As explained in our copending Application it is desirable so to control the supply of reactants to the mixing chamber that the amount of silicate, measured as $SiO_2$, in the product leaving the chamber to the hydraulic ejector is from 0.5 to 5.0 by weight and preferably the reactants are supplied in such proportions that the pH of the product is from 3 to 7.5. As explained in the copending Application it is preferable to observe the relationship between the silicate content and the pH such that at low silicate contents lower pH values are used and at higher silicate contents higher pH values are used. Thus the preferred pH range at 0.5% $SiO_2$ is 3 to 4.2 while the preferred pH range at 5% $SiO_2$ is from 5.5 to 7.5.

The apparatus is designed to be operated continuously with the ingredients being fed continuously to the chamber and the product being withdrawn continuously from the chamber by the hydraulic ejector.

The apparatus is of particular value as part of the plant required for purification of a municipal water supply and in such plant is positioned between the entry of the water to be purified and the passage of the water through a separation device such as a filter, a vertical sludge blanket or a horizontal sedimentation device. Either some of the water to be purified may be fed through the hydraulic ejector and fed back into the main stream or other water may be used to operate the ejector and the resultant solution led into the main stream to be purified. Naturally suitable control means will usually be provided in ducting leading to and from the hydraulic ejector.

The hydraulic ejector may be of conventional design comprising a nozzle to which high pressure water supply is led leading to a throat to which liquid from the chamber is led by the outlet from the chamber.

Apparatus according to the invention is illustrated in the accompanying drawings in which:

FIG. 5 is a diagramatic illustration of water treatment plant.

Figure 1:
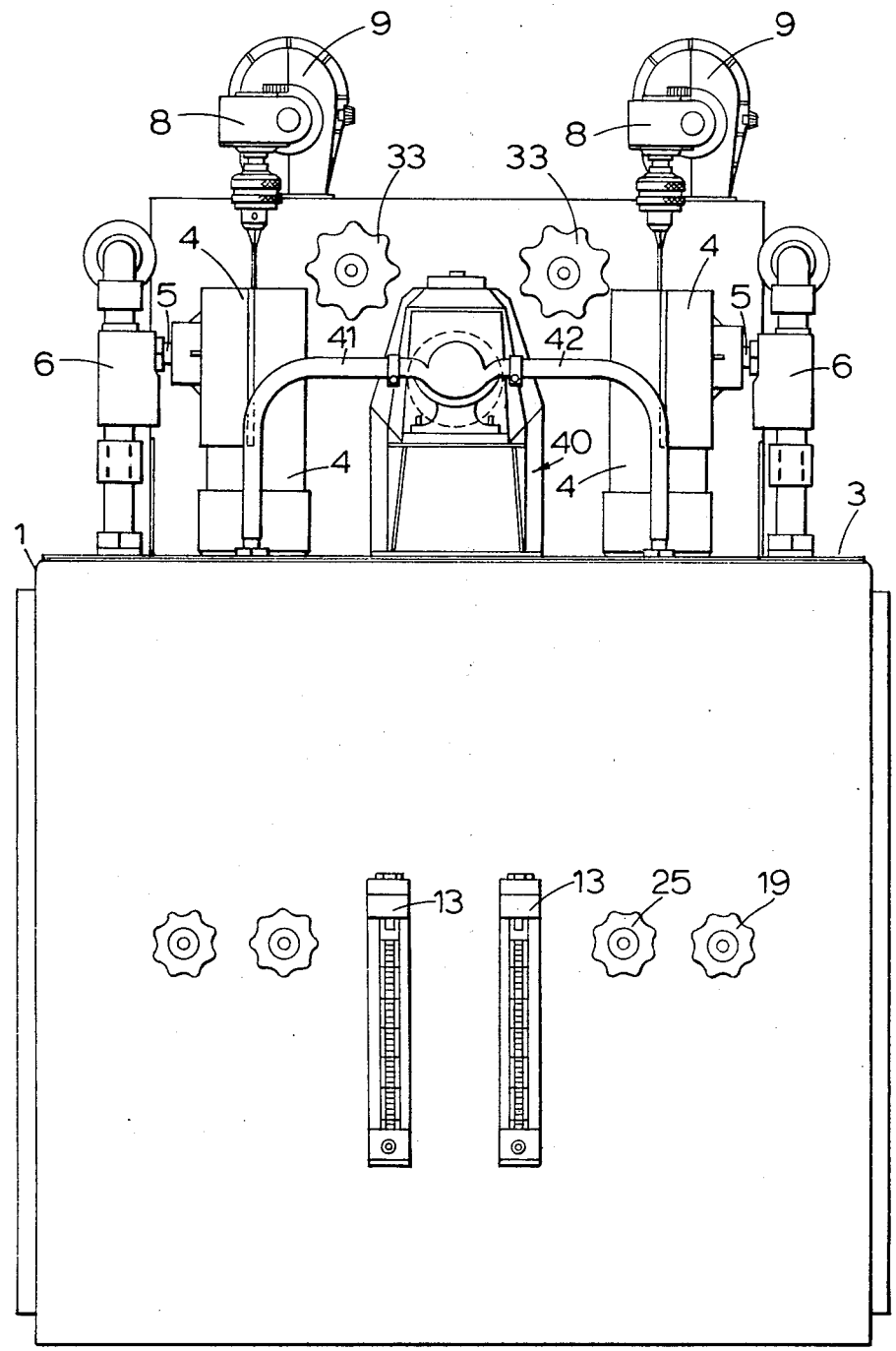
FIG. 1 is a front elevation of the apparatus.
Figure 2:
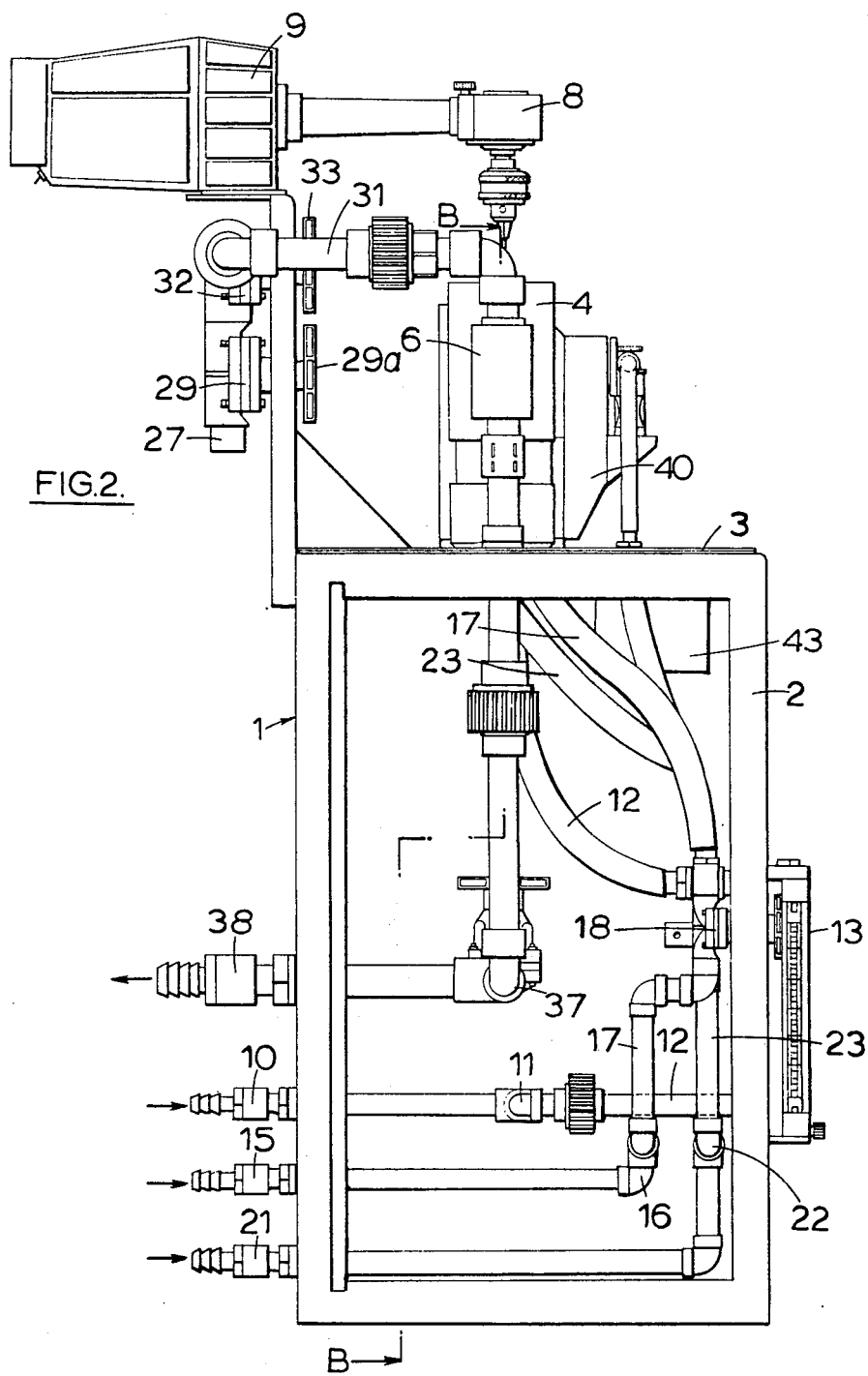
FIG. 2 is a side elevation, with the side of the lower part removed.
Figure 3:
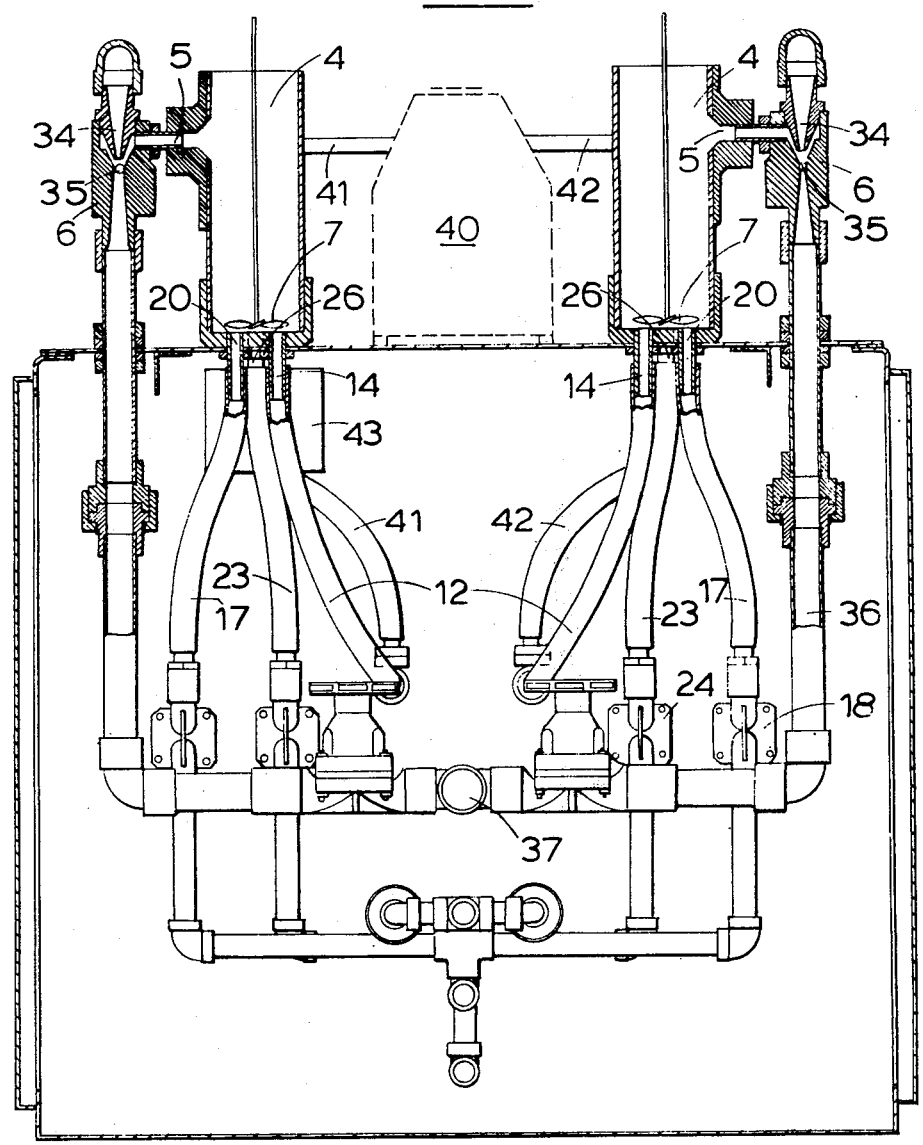
FIG. 3 is a section on the line B—B in FIG. 2.

The apparatus illustrated in FIGS. 1 to 3 has a single supply of ingredients and a single outlet point but includes two mixing chambers, each with its associated hydraulic ejector, in order that one can permanently be in reserve. However this is not essential and the apparatus shown in FIG. 4 has a single mixing chamber with its associated hydraulic ejector and supplies.

The apparatus shown in FIGS. 1 to 3 comprises a cabinet 1 having a face 2 and a lid 3. Above the cabinet there are fixed mixing chambers each of 10 cm internal diameter and a duct 5 leads out of each mixer near the top thereof to a hydraulic ejector 6. Each mixer is equipped with a stirrer 7 which is capable of being driven at high velocity, for example more than 1,000 r.p.m, usually about 3,000 r.p.m, through a gear box 8 by a motor 9. The stirrer 7 comprises three blades arranged radially at 120° to each other, each blade being about 3.5 centimeters long, measured from the axis of the chamber.

Water is supplied through an inlet 10 to a T-junction 11 from each arm of which identical ducting 12 leads. Each arm of ducting leads via a flow meter 13 equipped with a needle valve control to an inlet 14 in the base of each mixing vessel 4.

Sodium silicate solution having a pH of 12 to 12.5 is introduced through inlet 15 to T-junction 16. Each arm from this junction is formed of ducting 17 leading via control valve 18, having a manually operated wheel 19, to an inlet 20 in each mixing vessel.

Similarly, aluminium sulphate solution is introduced through inlet 21 to a T-junction 22 and each arm from this junction is formed by ducting 23 which leads, via a valve 24 having a manually operated wheel 25 to an inlet 26 in each mixing vessel.

The inlets 14, 20 and 26 are arranged at 120° to each other around a circle coaxial with the chamber and having a diameter of 7 centimeters, so that the tips of the blades of the stirrer pass over the inlets. The stirrer is so positioned that the space between the inlets and the stirrer is about 1 to 2 millimeters.

High pressure water supply is fed to ejector 6 through pipe 27 past a valve 29 havingg a control wheel 29a to a T-junction from each arm of which ducting 31 leads through a valve 32, operated by control wheel 33, to the ejector. The ejector can be of basically known design comprising a nozzle 34 leading to a throat 35 to which the liquid in the chamber 4 is led via ducting 5. Preferably the ejector is made of polyvinyl chloride. The mixture of liquid from the mixing chamber and the water supplied under pressure to the ejector passes down pipe 36 and each pipe 36 merges at 37 to an outlet 38.

In operation one side only of the apparatus is used at a time, the valves on the other side being closed so as to prevent the flow of liquid through that side. In order to start up operation of one side valve 33 is opened to start operation of the ejector, the mixer is rotated and valves 13 and 18 are opened to start the flow of water and sodium silicate to the mixing chamber. The valves are adjusted until the mixture in the chamber has a pH that is of the desired value to indicate the appropriate amount of water, generally 10.8 to 11.3. Thereafter valve 24 is opened to start the flow of aluminium sulphate, the valve being adjusted so that the product leaving the mixing vessel has the desired pH.

The supply of sodium silicate and aluminium sulphate to inlets 15 and 21 may be by any convenient means, for example by a displacement pump.

The apparatus also includes a time controlled flow inducer system 40 from which pipes 41 and 42 lead. In the apparatus shown in the drawings the right hand unit is in operation in which case pipe 42 is connected to the ducting 12 on the mixing vessel side of valve 13 and pipe 41 is connected to a container 43 for hydrochloric acid. At suitable time intervals the flow inducer system 40 operates to suck acid out of container 43 and pump it through pipes 41 and 42 into ducting 12. When the left hand unit is to be operated, in place of the right hand unit, the pipe 41 is disconnected from the acid container and is connected instead to the ducting 12 on the left hand unit and pipe 42 is disconnected from ducting 12 on the right hand unit and is connected to an acid container, which usually is positioned then in the right hand side of the unit.

Figure 4:
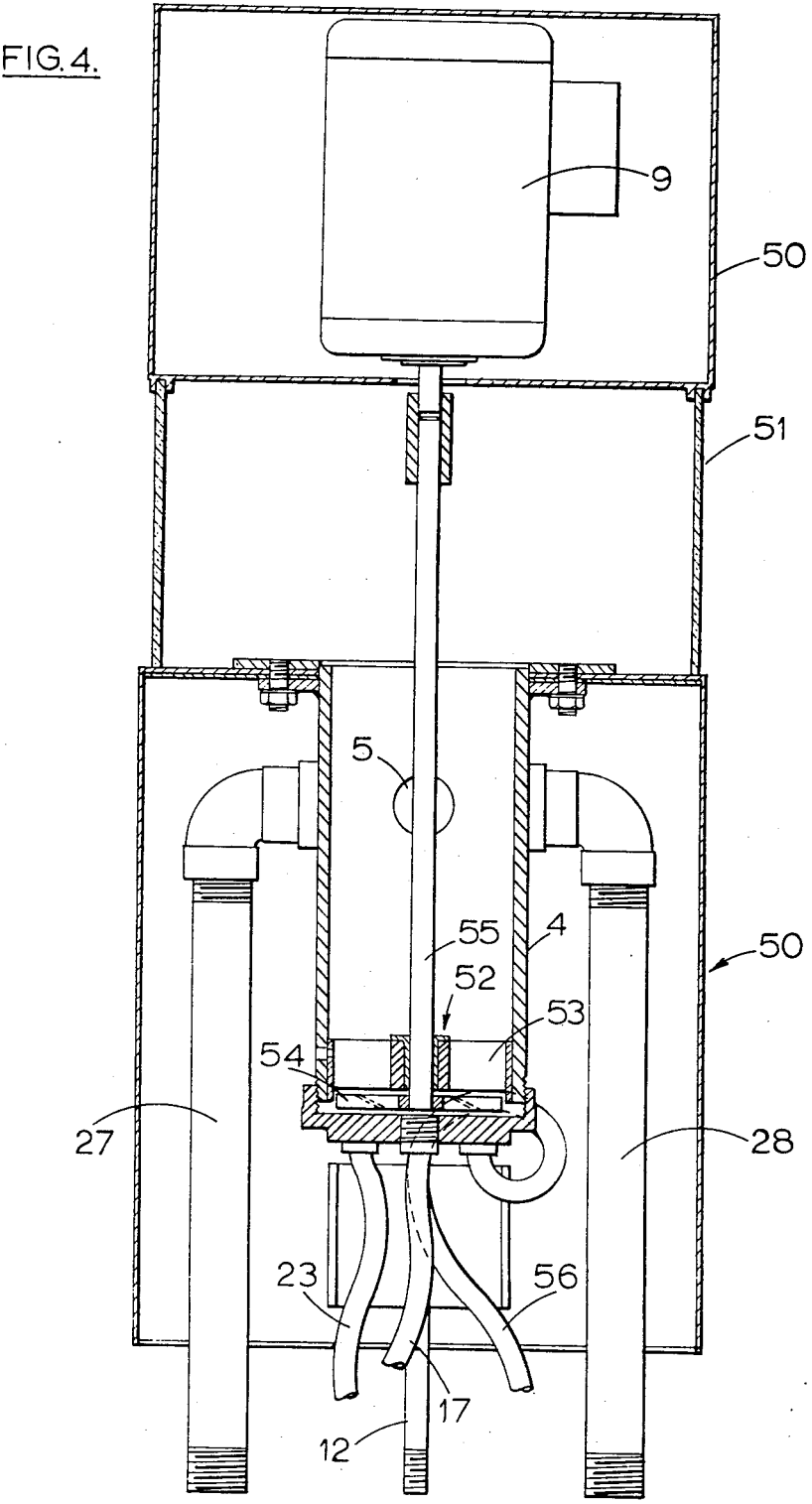
FIG. 4 is a vertical section through an alternative apparatus.

The apparatus shown in FIG. 4 has a single mixing chamber 4 with its associated motor and supply inlets and outlets and all the necessary control mechanism enclosed within a case 50. The part of the case 51 between the motor and the top of the mixing chamber may conveniently be made of a transparent material while the remainder of the case is preferably of metal or other opaque material.

The mixing chamber 4 is an open cylindrical vessel with an outlet 5 leading to a hydraulic ejector fitted as shown in FIGS. 1 to 3 and having associated inlet pipes 27 and outlet pipes 28. Water is fed to the base of the chamber through ducting 12, sodium silicate through ducting 17 and aluminium sulphate through ducting 23. The ducting 12, 17 and 23 may lead direct, through suitable metering devices, from the water supply, sodium silicate supply and aluminium sulphate supply respectively.

Instead of having the mixer 7 illustrated in FIGS. 1 to 3 the apparatus of FIG. 4 is equipped with an emulsifier unit 52 which is fitted within a chamber of the same size and having the same arrangement of inlets as described above. The emulsifier unit comprises stator blades 53 that are fixed to the sides of the chamber at an angle of 10° to 20° from vertical. Between the inlets and the stator blades are rotor blades 54 mounted on a rotatable shaft 55. The rotor blades preferably cover an area having a diameter of about 9.4 mm.

The rotor blades are at a small angle for example 10° to 20°, to the horizontal, and have a very small clearance from the stator blades 53. The clearance may be, for example, from 0.8 mm to 6 mm and is preferably about 1.5 mm. The rotor blades may rotate at for example from 2,000 to 5,000 r.p.m. most preferably about 3,000 r.p.m. Preferably there are six blades and six stator blades although this number may be varied to suit conditions. For example it may sometimes be preferred to have three rotor blades and three stator blades.

A further modification in the apparatus is illustrated in that ducting 56 leads direct from a suitable acid container, through a suitable metering device, to permit feeding of acid to the container whenever appropriate through an inlet coaxial with the chamber.

In a typical example concentrated sodium silicate solution having a specific gravity of 1.393 and a pH of 12.5 – 13.0 is delivered through inlet 15 at the rate of 18 gallons per day while aluminium sulphate solution having a concentration of 1–2 lbs per gallon and a pH of about 2.1 is delivered to inlet 21 at the rate of 50 gallons per day. Water having a hardness of 350 ppm and a pH of about 7.6 is supplied to inlet 10 at the rate of 35 gallons per hour. The volume of water is such that the pH of the combined liquid entering through inlets 10 and 15, in the absence of aluminium sulphate, is between 10.8 and 11.3. The pH of the product leaving the mixing chamber 4 is 3.7. The stirrer 7 rotates at 3,000 rpm. The mixing chamber has a capacity of 1 litre.

Every 6 hours 300 cc of concentrated hydrochloric acid is introduced into the water supply through ducting 42 over a period of 27 seconds.

Raw untreated water from a supply 60 and to which 40 ppm aluminium sulphate has been added was fed to the hydraulic ejector through a pump 61 at the rate of 500 gallons per hour.

The product was led from the ejector by ducting 28 into the main stream of the supply 60. The stream then passed through sedimentation plant 63 and filtration plant 64 to produce water which, after further treatment such as chlorination, is fit for use as municipal water.

In an alternative arrangement, instead of providing pump 61 to feed water from stream 60 through ducting 27 to operate the ejector, water may be fed direct into the ducting 27 from any suitable high pressure supply.

Equally successful results are obtainable when the product is used either in a vertical sludge blanket system or in a horizontal sedimentation system.

Using the process and apparatus described it is possible to obtain increased through-put and/or a saving in chemical treatment costs compared to known processes using activated silica. Also the apparatus is much smaller than has been required previously.

I claim:

1. Apparatus comprising a mixing chamber which is an upright cylindrical vessel, at least three separate inlets which lead non-axially into the bottom of the vessel, said inlets being positioned substantially uniformly around the bottom of the vessel at a distance of from about one half to seven eighths of the radius of the bottom of the vessel from the axis of the vessel, an outlet duct leading from the vessel near its top, a hydraulic ejector to which the outlet duct leads, and means for mixing under high shear within the vessel material introduced through the inlets, said mixing means being from 0.5 to 6 mm from the bottom of the vessel between the inlets and the outlet.

2. Apparatus according to claim 1 in which the means for applying high shear comprise rotor blades and means for rotating the rotor blades at a speed greater than 1,000 r.p.m.

3. Apparatus according to claim 1 in which the chamber has at least four inlets.

4. Apparatus according to claim 1 in which ducting leads to each inlet through control and metering means.

5. Apparatus according to claim 1 in which one of said inlets is utilized for the introduction of acid for cleaning the chamber.

6. Apparatus comprising a mixing chamber which is an upright cylindrical vessel, at least three separate inlets which lead non-axially into the bottom of the vessel, an outlet duct leading from the vessel near its top, a hydraulic ejector to which the outlet duct leads, rotor blades for mixing under high shear within the vessel material introduced through the inlets, said rotor blades being close to the bottom of the vessel between the inlets and the outlet, means for rotating the rotor blades at a speed greater than 1,000 r.p.m., and stator blades positioned in the mixing chamber with a small clearance between the rotor and stator blades.

7. Apparatus comprising a mixing chamber which is an upright cylindrical vessel, at least three separate inlets which lead non-axially into the bottom of the vessel, an outlet duct leading from the vessel near its top, a hydraulic ejector to which the outlet duct leads, rotor blades arranged at 10° to 20° to the horizontal for mixing under high shear within the vessel material introduced through the inlets, said rotor blades being close to the bottom of the vessel, between the inlets and the outlet, means for rotating the rotor blades at a speed greater than 1,000 r.p.m., and stator blades arranged at 10° to 20° to the vertical and positioned in the chamber with a clearance of 0.8 to 6 mm between the stator and rotor blades.

* * * * *